(No Model.)

E. S. SUTTON.
SELF OILING LOOSE PULLEY.

No. 355,666. Patented Jan. 4, 1887.

WITNESSES
Villette Anderson.
Philip E. Masi.

INVENTOR
E. S. Sutton.
by Anderson & Smith
ATTORNEYS

UNITED STATES PATENT OFFICE.

EUGENE SILAS SUTTON, OF SNOHOMISH, WASHINGTON TERRITORY.

SELF-OILING LOOSE PULLEY.

SPECIFICATION forming part of Letters Patent No. 355,666, dated January 4, 1887.

Application filed September 7, 1886. Serial No. 212,931. (No model.)

*To all whom it may concern:*

Be it known that I, EUGENE SILAS SUTTON, a citizen of the United States, residing at Snohomish, in the county of Snohomish and Territory of Washington, have invented certain new and useful Improvements in Self-Oiling Loose Pulleys; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
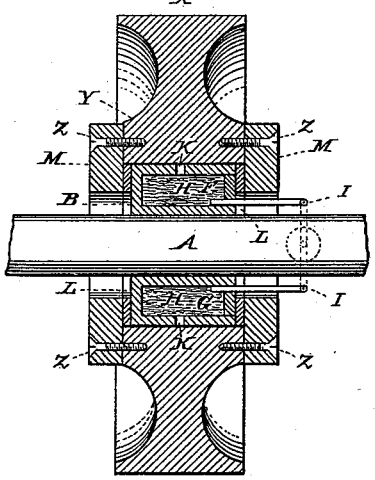
Figure 2:
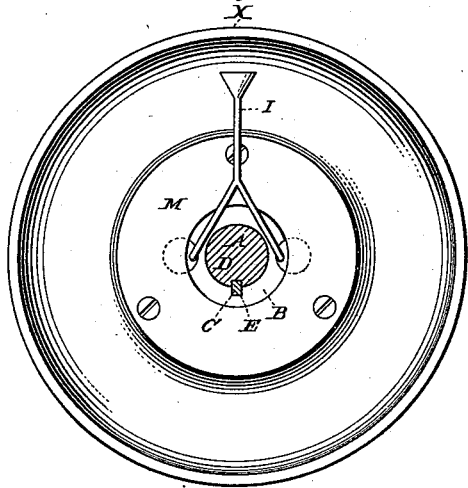

Figure 1 of the drawings is a representation of this invention, and is a horizontal section. Fig. 2 is a side view, the shaft and key being shown in section.

My invention relates to self-oiling oil-hubs for loose pulleys and other bearings; and it consists in the construction and novel combination of parts, as hereinafter described, and pointed out in the claim.

Referring by letter to the accompanying drawings, A designates the stationary shaft upon which the self-oiling hub B is mounted and secured by screws, or by a key, C, inserted into aligned longitudinal grooves D E in the shaft A and the interior of the hub B.

The oil-hub may be cast hollow, or it may be drilled from the end, as at F G, and plugged up afterward to form the oil-chamber H in said hub B. In either event an angular feed-tube, I, is inserted into one end of the hub B and extends upwardly along one side of the pulley X, so that the oil can be fed or supplied through this feed-tube, which is afterward corked or plugged. By this construction the pulley can be oiled while in motion and without shifting the belt, as the oil-hub stands still. The oil passes out through peripheral holes K in the oil-hub, and is confined within the bore of the pulley until it is entirely used up by the friction of the pulley on the oil-hub.

Leather washers L are interposed between the ends of the oil-hub and the rings M M on the ends of the loose pulley X, said rings being secured to the ends of the pulley-hub Y by screws Z, or one of said rings M or M may be cast integral with the pulley, and the other ring only secured in place by screws. Waste—such as wicking or the like—may be employed to hold the oil in suspension, such as is employed in car-axle and other lubricators.

Having described this invention, what I claim, and desire to secure by Letters Patent, is—

The combination, with the shaft having the oil-hub keyed thereto, and provided with the feed-tube and peripheral discharge-openings, of the loose pulley mounted on the oil-hub, the end rings secured to said loose pulley, and the washers interposed between the pulley and end rings, substantially as specified.

In testimony whereof I affix my signature in presence of two witnesses.

EUGENE SILAS SUTTON.

Witnesses:
J. H. PLUSHETT,
RICHARD FARWILBGEDS.